Figure 2:
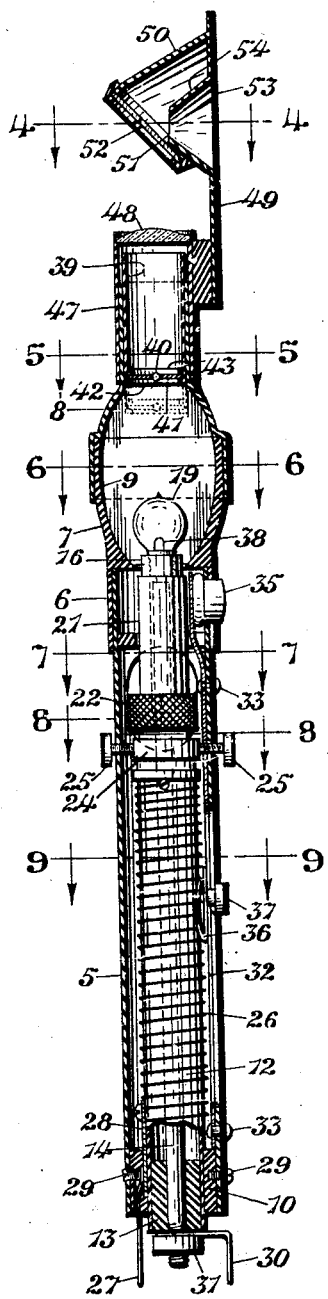

Nov. 20, 1928.

C. E. H. ARMBRUSTER 1,692,241

DIAGNOSTIC INSTRUMENT

Filed May 14, 1923   2 Sheets-Sheet 1

INVENTOR.
C.E.H. Armbruster
BY
ATTORNEY.

Nov. 20, 1928.
C. E. H. ARMBRUSTER
1,692,241
DIAGNOSTIC INSTRUMENT
Filed May 14, 1923   2 Sheets-Sheet 2
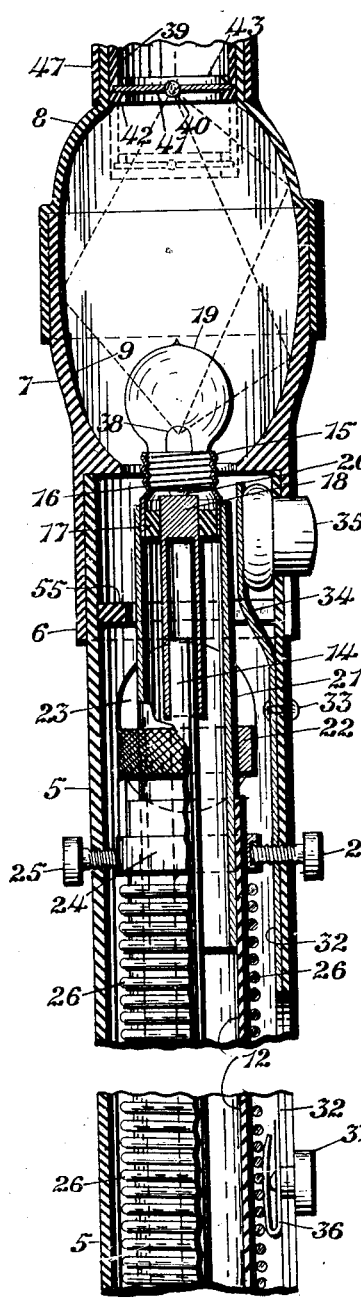
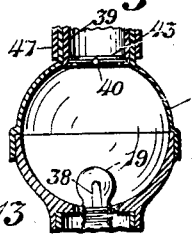
INVENTOR.
C. E. H. Armbruster
BY
ATTORNEY.

Patented Nov. 20, 1928.

1,692,241

UNITED STATES PATENT OFFICE.

CHARLES E. H. ARMBRUSTER, OF DENVER, COLORADO.

DIAGNOSTIC INSTRUMENT.

Application filed May 14, 1923. Serial No. 638,847.

My invention relates to diagnostic instruments and more particularly to optical instruments of the class exemplified by the ophthalmoscope and the retinoscope which are employed by oculists and others versed in the art, to diagnose ocular diseases and the refractive condition of the eye of a patient by means of a beam of artificial light.

In instruments of this class, rays of light emanating from a source contained within a suitable holder, pass through a condensing lens onto an inclined mirror which reflects them in the form of a forwardly directed beam onto the object under examination, and which usually has a central opening through which the operator observes the illuminated parts.

In order to make an accurate and correct diagnosis of the condition of the eye upon which the light beam is directed, it is essential that the projection of the beam be without shadows, images or other imperfections which impair its clearness, that the beam be of much strength and brilliancy so as to clearly illuminate the eye irrespective of the distance at which the instrument is held, and that the vision of the operator looking through the sight hole of the reflector, be unimpaired by reflexes or restrictions.

It is the principal object of the present invention to provide by an improved construction and novel co-operative arrangement of parts in a self-luminous ophthalmoscopic or retinoscopic instrument, a round beam of light which produces a projection free from images and shadows such as those caused by the filament of an incandescent lamp used to generate the light, and another object is to provide in association with the sight hole through which the operator observes the illuminated object, a means which protects the eye of the observer from the reflexes produced by the effect of the return light upon parts of the instrument adjacent the sight hole, and which at the same time widens the field of vision of the operator and thereby facilitates the diagnostic examination through the restricted opening.

I obtain the first mentioned object by providing a reflector designed to concentrate the rays of light emanating from the incandescent lamp, in one focal point and to place at said point a light receiving or collecting object which becomes an auxiliary or secondary source of light of limited area and clearly outlined contour. The light rays gathered in this secondary source pass through the condensing lens of the instrument to the slanting mirror which reflects them onto the eye or other object under examination.

The second above mentioned object I attain by providing a cone-shaped, open-ended eye-piece the small end of which is positioned rearwardly of and in close proximity to the sight-hole in the slanting mirror. This eye-piece not only prevents the formation of "reflexes" back of the mirror, liable to cloud the vision of the operator but also reduces the space between the end of the light passage in the eye-piece and the sight-hole and thereby widens the operator's field of vision.

In addition to the two objects hereinabove explained, my invention has for its object to provide in a luminous diagnostic instrument, a light collector composed of a spherical body of preferably transparent material; a further object is to provide ready means for the adjustment of the lamp relative to the axis and the focal point of the reflector, and for producing other adjustments of parts, designed to effect and maintain their correct co-operative disposition, and still another object is to provide in a luminous instrument of the described character, an effective controlling medium to regulate the illuminative power of the light beam produced in its operation.

Further objects relate to minor details of construction the nature and advantages of which will be brought out in the course of the following description.

I am aware that attempts have been made to eliminate the image of the lamp filament from the projection of the light beam by interposing a light-restricting object between the source of light and the condensing lens of the instrument, but this method of correction while effective to some extent, has the disadvantage of reducing the intensity of the light beam, and thereby prevents the perfect illumination of the eye required to accurately and correctly diagnose its condition. By the use of my invention, all irregularities are eliminated from the light beam not only without deteriorating its intensity but with an increase in its illuminative power which as stated before, is most desirable.

Figure 1:
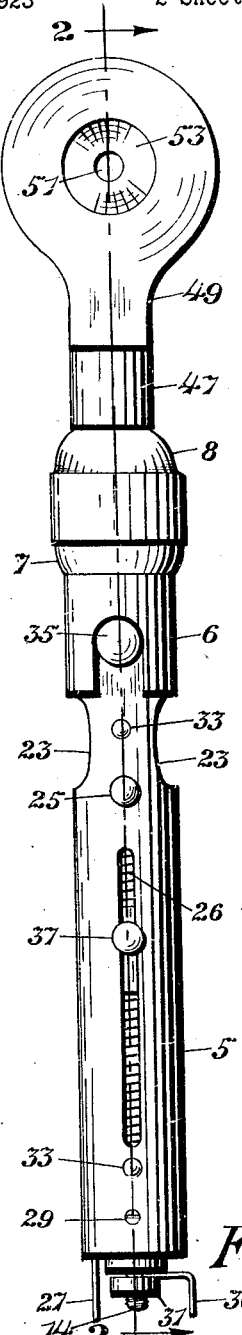

In the accompanying drawings in which like characters of reference designate corresponding parts throughout the several views, Figure 1 represents an elevation of a retinoscope embodying my invention;

Figure 2, a longitudinal section taken on the line 2—2, Figure 1;

Figure 3, an enlarged fragmentary sectional elevation in the same plane;

Figure 4, a transverse section along the line 4—4, Figure 2, drawn to an enlarged scale;

Figure 5, a similar section taken on the line 5—5, Figure 2;

Figure 6, an enlarged cross section on the line 6—6, Figure 2;

Figure 7, a similar section along the line 7—7, Figure 2;

Figure 8, a transverse section in the plane indicated by the line 8—8 in Figure 2, drawn to an enlarged scale;

Figure 9, a section of similar description on the line 9—9, Figure 2;

Figure 10, a fragmentary section of the preferred light-receiving or collecting element of the invention and its support, drawn to an exaggerated scale;

Figures 11 and 12, sections similar to Figure 10, showing modifications in the construction of the collector; and Figure 13, a fragmentary sectional elevation showing a modified construction of the reflector of the instrument.

Referring more specifically to the drawings, the numeral 5 designates a hollow cylindrical handle made of rubber, fiber or other non-conductive material.

Fitted upon an end of this handle by means of a tubular extension 6 is the lamp-housing 7 which at its upper end has a second tubular extension 8, in axial alinement with the other for the support of the condensing lens and the light-collector of the instrument as will hereinafter be more fully described.

The lamp-housing is made in two sections one of which fits slidably upon the other, and its interior surface is curved and silvered, polished or otherwise made light reflective, to provide the elliptical parabolic reflector 9 which constitutes one of the principal features of my invention.

The end of the handle opposite to that at which the lamp-housing is supported, is partially closed by a ring 10 of non-conducting material in which is supported the insulating tubular core 12 of a rheostat which in the operation of the instrument, serves to regulate the intensity of the light beam.

The end of the core is closed by an insulating plug 13 and fastened to this plug is a metallic rod 14 which extends axially through the core and beyond the opposite end thereof to connect with a correspondingly formed part of a lamp socket 15. The socket consists of the usual metallic shell 16 which is beaded to receive the incandescent lamp 19 of the instrument, an insulating plug 17 at an end of the shell, and a metallic contact piece 18 which protrudes through a central opening of the plug to engage with the inner terminal 20 of the lamp and which has a tubular extension slidably and rotatably fitted upon the rod 14.

The socket 15 constructed as above described, is fastened to a tubular stem 21 which is fitted to slide and turn in the hollow core of the rheostat. The stem has a milled head 22 to facilitate its adjustment, which is accessible to the fingers of the operator through opposite openings 23 in the handle of the instrument.

A ring 24 placed around the core of the rheostat adjacent its end inmost with relation to the handle, is engaged by set screws 25 which protrude through correspondingly threaded apertures at diametrically opposite points of the handle, and which in co-operation with the core, provide a convenient means for the lateral adjustment of the lamp relative to the axis of the reflective surface.

Wound upon the core of the rheostate in spiral form, is a conductor of electricity 26 which at one end is connected to a circuit-wire 27 by means of a conductive strip 28, the wire being attached to the instrument by a set-screw 29. Another circuit wire 30 is fastened to the metallic rod 14 by means of a binding nut 31 and the two wires may be attached to any suitable appliance, such as the conventional plug, to connect them in circuit with a suitable and conveniently located source of electricity.

A metal strip 32 extending longitudinally of the non-conductive handle of the instrument against the interior surface thereof is fastened by means of rivets 33, and it has a free end portion 34 which by the inherent resiliency of the metal is adapted to be moved into contact with the metallic stem 21 of the lamp-socket through the instrumentality of a push button 35 which extends loosely through an opening in the wall of the handle.

A sliding brush 36 adapted to yieldingly engage with the convolutions of the conductor wound around the core of the rheostat, is fastened to a button 37 the shank of which extends loosely through registering longitudinal slots of the handle and the conductive strip, the latter being engaged by the brush for its electrical connection with said conductor.

Premising that the end of the filament of the lamp opposite to that connected with the terminal 20 engaged by the contact of the socket, terminates in the metallic shell of the lamp which through the medium of the shell of the socket is in electric connection with the stem 21, it will be seen that when through the medium of the push button 35 the free end of the strip is brought in engagement with the stem, the circuit is completed through the filament of the lamp along a path which beginning in the source of electricity, includes the wire 30, the metallic rod 14, the contact piece 18, the terminal 20 of the lamp, the filament 38 of the lamp, the shell 16 of the socket, the stem 21 of the same, the conductive strip 33, the brush 36, the convolution of the conductor 26 with which the strip engages, and the wire 27 which by means of the strip 28 is connected with the end of the conductor 26, and that by moving the brush along the rheostat by means of the button 37, the resistance to the current flow produced by the winding conductor may be varied, and the strength of the light produced by the incandescence of the filament proportionately regulated.

Slidably fitted inside the tubular extension 8 of the lamp-housing is a tube 39 which at its inner end carries the element which receives and collects the rays of light emanated from the lamp.

In the preferred construction illustrated in detail in Figure 10, the receiver consists of a sphere 40, of transparent glass or other suitable material, which is set in a central opening of a plate or diaphragm 41 of opaque material which is fastened in the end of the tube.

The tube has to this end an annular shoulder 42 upon which the diaphragm is supported, and a split ring 43 engaging the opposite side of the diaphragm holds it against displacement.

In the form shown in Figure 11, a small disk 44 of translucent material, such as ground or opal glass, is substituted for the sphere and in the modification illustrated in Figure 12 a plate 45 of similar material is superimposed upon the diaphragm to cover the central opening 46 thereof.

Slidably fitted around the extension of the lamp-housing is a sleeve 47 which at its outer end carries the condensing lens 48 which may be of any suitable form. Fastened upon the end of the lens-sleeve is a plate 49 provided with a casing 50 which supports the reflecting mirror 51.

The mirror is inclined at an angle of approximately forty-five degrees above the condensing lens and it has a central sight-opening 52 in the axis of the lens which is coincident with the axes of the lamp-housing and the light-receiving element.

The plate 49 has an opening 53 the center of which is in an axis of the sight-hole of the mirror, at right angles to the axis of the condensing lens, and extending inwardly from this opening is the open-ended conical eyepiece 54 which has its small end opposite and in close proximity to the sight hole 52.

Having thus described my invention, it will be apparent that when the lamp is brought to an incandescent condition by pressing the free end 34 of the contact strip into engagement with the stem 21 of the socket 15, the rays of light emanated from the lamp are reflected by the parabolic interior surface of the lamp-housing which being appropriately curved, causes them to concentrate in the receiver of the collector.

The receiver while obstructing the passage of direct light rays issued from the filament, thus becomes a secondary source of light of great illuminative power since it gathers in one point every ray of light produced in the lamp, and being of small and limited area, it provides a brilliant spot of light which passes through the restricted conduit provided by the tubular extension of the housing to and through the condensing lens.

The beam of light produced by the latter is reflected by the mirror at an angle of about ninety degrees to the axis of the instrument, and the operator by proper manipulation of the instrument causes this beam to strike the eye of the patient. By looking through the eye-piece and the therewith alined sight-hole of the mirror, the operator observes the illuminated parts of the organ and diagnoses the condition thereof.

The illumination of the eye is entirely free from shadows or spots produced by an image of the filament owing to the presence of the receiving element which as stated hereinbefore, obstructs the passage of direct light rays emanating from the filament, and it is at the same time of greater brilliancy and clearness than could be produced by the lamp without the receiving element or from the lamp and the receiving element without the parabolic reflector.

Those versed in the art will readily appreciate the importance of this condition by virtue of the fact that in order to make a correct diagnosis of the condition of the patient's eye, the slightest motion of the return light or reflex from the eye must be seen by the operator through the sight-hole of the mirror.

The conical sight piece eliminates the clouding effect due to light rays striking the walls of the casing or other support to which the slanting mirror is fastened and by the position of its small end in close proximity to the sight opening; it enlarges the field of vision of the operator and prevents loss of the return light from the patient's eye as would occur if the sight-hole and the therewith alined aperture through which the operator looks, were further apart as in most instruments of the type of that of the present invention, at present in use.

It will be evident that the correct position of the filament of the lamp relative to the axis and the focal point of the elliptical reflector is of paramount importance in the operation of the instrument and that, therefore, the adjustments of the lamp hereinabove described, are a valuable feature of the invention.

By longitudinal or rotary movement of the stem of the lamp socket in the hollow core of the rheostat, the distance of the lamp filament from the focal point and the position of the filament relative to the axis of the reflector, are readily adjusted, it being apparent that to obtain the desired result, it is necessary that the filament should be axially coincident with the axis of the reflector.

The adjustment of the filament to the axis of the reflector is readily accomplished by means of the set screws 25 and by rotation of the lamp socket through the medium of the milled head 22, it being understood that the core of the rheostat upon which the set screws act, is sufficiently deflective to permit of the slight adjustment of the lamp usually required, especially owing to the fact that it is held at one end only.

The slidable connection of the sleeve of the condensing lens and the tube which carries the light-receiver, with the upper extension of the lamp-housing, admits of adjustment of both these elements, it being observed that in order to obtain the best results, the receiver should extend a short distance within the reflective surface as indicated in broken lines in Figures 2 and 3.

The illuminating power of the lamp is easily regulated by adjustment of the brush 36 as hereinbefore explained, the sectional construction of the lamp-housing affords ready access to the lamp socket for renewal of the lamp, and a partition 55 in the handle obstructs the downward passage of the light rays.

While I have shown and described the reflector as being parabolic or preferably elliptical parabolic, I desire it understood that a semi-spherical reflector will produce satisfactory results and is advantageous over others in that it can be made at less expense and in that it does not necessitate the accurate adjustment required in the use of a reflector of irregular form. A spherical housing the lower portion of which is reflective, has been shown at 56 in Figure 13 of the drawings.

Having thus described my invention, what I claim and desire to secure by Letters Patent is:

1. In an instrument of the character described, an incandescent lamp, a housing, a reflector in the housing, adapted to direct the light rays from the lamp to a focal point, an adjustable diaphragm closing the housing and having a restricted outlet in the axis of the reflector passing through its focal point, and a light receiver closing the outlet.

2. In an nistrument of the character described, a handle, a lamp-housing thereon, an incandescent lamp in the housing, a reflector adapted to direct the light rays from the lamp to a focal point, a yieldable support for the lamp, inside the handle, and means adapted to laterally adjust the lamp with relation to the axis of the reflector, by action upon its support.

3. In an instrument of the character described, a handle, a rheostat mounted therein for lateral deflection, a lamp-housing on the handle, an incandescent lamp in the housing, supported on the rheostat, a reflector adapted to direct the light rays from the lamp to a focal point, and means adapted to adjust the lamp relative to the axis of the reflector by action upon the rheostat.

4. In an instrument of the character described, an incandescent lamp, a reflector adapted to direct the rays of the lamp to a focal point, a light-receiving element at said point, and means for the rotary and lateral adjustment of the lamp to place its filament in the axis of the reflector.

5. A diagnostic instrument comprising a casing, a lens at an end thereof, a reflector to throw light passing through the lens to the subject under diagnosis, a source of light in the casing, a reflector directing the light rays from the source to a focal point in the axis of the lens, and an element at said focal point, for the concentration and transmission of said light rays.

6. In a diagnostic instrument, a source of light, an enclosing element having a reflective surface to direct the light rays from the source to one focal point, and having an aperture co-incident with said point, and a light-transmitting element in said aperture adapted to condense the light rays within itself and become a secondary source of light.

7. In a diagnostic instrument, the combination of a lens, a source of light, a reflector to direct the light rays from the source to a focal point in the axis of the lens, and a light-transmitting element at said focal point adapted to condense the light rays within itself and become a secondary source of light.

8. In a diagnostic instrument, the combination of a lens, a source of light, an elliptical reflector to direct the light rays from the source to a focal point in the axis of the lens, and a light-transmitting sphere at said focal point for the concentration and transmission of said light rays.

9. In a diagnostic instrument, a reflector having a peep-hole, a member having in alinement with said peep-hole an opening to which the eye of the operator is applied, and a light-obstructing open-ended funnel extending forwardly from said opening and terminating in close proximity to the peep-hole of the reflector.

10. A diagnostic instrument comprising a casing, a lens at an end thereof, a source of light in the casing, a reflector directing the light rays from the source to a focal point in the axis of the lens, an element at said focal point for the concentration and transmission of said light rays, a reflector having a peep-hole in said axis, a member having in alinement with said peep-hole an opening at which the eye of the operator is applied and a light obstructing open-ended funnel extending forwardly from said opening and terminating in close proximity to the peep-hole of the reflector.

11. In a diagnostic instrument, a source of light, an element having a reflective surface enclosing the same and adapted to direct the light rays from the source to one focal point, and a light-transmitting element at said focal point adapted to concentrate the light rays within itself and thereby become a secondary source of light to emanate the light in a beam.

12. In a diagnostic instrument, a source of light, a housing for the light adapted to direct the light rays from the source to one focal point, and a light-transmitting sphere at said focal point adapted to concentrate the light rays within itself and thereby become a secondary source of light to emanate the light in a beam.

13. A diagnostic instrument comprising a casing, a lens at an end thereof, a reflector to direct light passing through the lens to the subject under diagnosis, a source of light in the casing, a reflector directing the light rays from the source to a focal point in the axis of the lens, and a light-transmitting sphere at said focal point for the concentration and transmission of said light rays.

14. In a diagnostic instrument, a source of light, a housing having a restricted outlet for the light rays emanating from the source, and a light-transmitting sphere closing said outlet.

15. In a diagnostic instrument, a lamp, a reflector adapted to direct the rays of the lamp to a focal point, and a light-transmitting element at said point, the lamp being mounted for adjustment along the axis of the reflector.

16. In a diagnostic instrument, a lamp, a reflector adapted to direct the rays of the lamp to a focal point, and a light-transmitting element at said point, the lamp being mounted for adjustment toward the axis of the reflector.

17. In a diagnostic instrument having a casing, a lamp, a reflector adapted to direct the rays of the lamp to a focal point, a light-transmitting element at said point, and means for adjustment of the lamp from outside the casing.

In testimony whereof I have affixed my signature.

CHARLES E. H. ARMBRUSTER.